US012589841B2

(12) United States Patent
Wu et al.

(10) Patent No.: US 12,589,841 B2
(45) Date of Patent: Mar. 31, 2026

(54) WATER SURFACE FLOATER COLLECTING SHIP

(71) Applicant: Suzhou Feichi Environmental Protection Technology Co., Ltd, Zhangjiagang (CN)

(72) Inventors: Cheng Wu, Zhangjiagang (CN); Fengliang Dong, Zhangjiagang (CN); Xiaoyu Xue, Zhangjiagang (CN); Lei Gao, Zhangjiagang (CN); Peisong Wu, Zhangjiagang (CN); Yunfei Qian, Zhangjiagang (CN); Lijing Yao, Zhangjiagang (CN); Junyi Shi, Zhangjiagang (CN)

(73) Assignee: Suzhou Feichi Environmental Protection Technology Co., Ltd, Zhangjiagang (CN)

( * ) Notice: Subject to any disclaimer, the term of this patent is extended or adjusted under 35 U.S.C. 154(b) by 439 days.

(21) Appl. No.: 18/460,278

(22) Filed: Sep. 1, 2023

(65) Prior Publication Data

US 2024/0083556 A1      Mar. 14, 2024

(30) Foreign Application Priority Data

Sep. 13, 2022    (CN) .......................... 202211110762.8

(51) Int. Cl.
| | |
|---|---|
| *B63B 35/32* | (2006.01) |
| *B63B 25/00* | (2006.01) |
| *B63B 79/40* | (2020.01) |
| *C02F 1/00* | (2023.01) |
| *C02F 1/40* | (2023.01) |
| *C02F 103/00* | (2006.01) |
| *E02B 15/10* | (2006.01) |

(52) U.S. Cl.
CPC ........... *B63B 35/32* (2013.01); *B63B 25/002* (2013.01); *B63B 79/40* (2020.01); *C02F 1/004* (2013.01); *C02F 1/40* (2013.01); *E02B 15/10* (2013.01); *C02F 2103/007* (2013.01); *C02F 2201/008* (2013.01)

(58) Field of Classification Search
None
See application file for complete search history.

(56) References Cited

U.S. PATENT DOCUMENTS

| | | | | | |
|---|---|---|---|---|---|
| 76,387 | A | * | 4/1868 | Bell ........................ | A01K 73/06 43/8 |
| 478,579 | A | * | 7/1892 | Dunham ................ | A01K 73/06 43/8 |

(Continued)

FOREIGN PATENT DOCUMENTS

| | | | | | |
|---|---|---|---|---|---|
| WO | WO-2019201711 A1 | * | 10/2019 | ............. | B63B 35/32 |

*Primary Examiner* — Robert J Popovics

(57) ABSTRACT

The present invention relates to the technical field of water surface waste treatment, and in particular to a water surface floater collecting ship. The technical problems are: picking up floaters with the cooperation of labors consumes manpower and causes disturbance of water surface, which makes the floaters float further away with water waves, and the odor emitted by the collected floating waste will pollute the environment and affect the salvage efficiency. The technical solution is: a water surface floater collecting ship, comprising a hull, a collecting system, etc.; the left part of the hull is connected with the collecting system used for collecting waste.

9 Claims, 11 Drawing Sheets

(56)                References Cited

U.S. PATENT DOCUMENTS

| | | | | | |
|---|---|---|---|---|---|
| 763,327 | A | * | 6/1904 | Roche | B01D 35/05 |
| | | | | | 210/242.1 |
| 1,138,541 | A | * | 5/1915 | Conekin | A01K 75/02 |
| | | | | | 123/73 D |
| 1,304,302 | A | * | 5/1919 | Gage | A01K 73/06 |
| | | | | | 43/8 |
| 1,486,485 | A | * | 3/1924 | Frissell | A01K 80/00 |
| | | | | | 43/6.5 |
| 1,489,917 | A | * | 4/1924 | Blecker | A01K 74/00 |
| | | | | | 43/17.5 |
| 1,490,428 | A | * | 4/1924 | Paris | A01K 74/00 |
| | | | | | 43/8 |
| 2,064,408 | A | * | 12/1936 | Blecker | A01K 74/00 |
| | | | | | 43/6.5 |
| 2,413,552 | A | * | 12/1946 | Ethridge | A01K 74/00 |
| | | | | | 43/103 |
| 2,890,543 | A | * | 6/1959 | Mitchell | A01K 73/02 |
| | | | | | 43/9.1 |
| 2,948,980 | A | * | 8/1960 | Worcester | A01K 80/00 |
| | | | | | 43/9.1 |
| 3,142,281 | A | * | 7/1964 | Muller | E02B 15/046 |
| | | | | | 210/923 |
| 3,219,190 | A | * | 11/1965 | Thune | E02B 15/046 |
| | | | | | 210/523 |
| 3,268,081 | A | * | 8/1966 | Menkee | E02B 15/046 |
| | | | | | 210/523 |
| 3,270,706 | A | * | 9/1966 | Muller | B63B 35/32 |
| | | | | | 114/264 |
| 3,326,379 | A | * | 6/1967 | Caddick | B63B 35/32 |
| | | | | | 210/523 |
| 3,348,690 | A | * | 10/1967 | Cornelissen | E02B 15/047 |
| | | | | | 210/523 |
| 3,434,444 | A | * | 3/1969 | Caddick | E02B 15/046 |
| | | | | | 114/57 |
| 3,539,048 | A | * | 11/1970 | Pearson | E02B 15/046 |
| | | | | | 210/242.3 |
| 3,563,380 | A | * | 2/1971 | Thomas | E02B 15/06 |
| | | | | | 210/776 |
| 3,617,555 | A | * | 11/1971 | Ginsburgh | E02B 15/104 |
| | | | | | 210/671 |
| 3,637,080 | A | * | 1/1972 | Markel | E02B 15/104 |
| | | | | | 210/776 |
| 3,656,623 | A | * | 4/1972 | Quase | E02B 15/046 |
| | | | | | 210/242.3 |
| 3,730,119 | A | * | 5/1973 | Budris | B63B 35/32 |
| | | | | | 210/242.3 |
| 3,731,813 | A | * | 5/1973 | Tipton | E02B 15/046 |
| | | | | | 210/776 |
| 3,732,161 | A | * | 5/1973 | Grutsch et al. | E02B 15/104 |
| | | | | | 210/671 |
| 3,762,558 | A | * | 10/1973 | Anderson | B63B 35/32 |
| | | | | | 210/776 |
| 3,767,055 | A | * | 10/1973 | Flatland | E02B 15/048 |
| | | | | | 210/167.2 |
| 3,786,592 | A | * | 1/1974 | Miller | A01K 74/00 |
| | | | | | 43/6.5 |
| 3,804,177 | A | * | 4/1974 | Renfroe | E02F 5/285 |
| | | | | | 210/776 |
| 3,926,812 | A | * | 12/1975 | Neal | B63B 35/32 |
| | | | | | 210/776 |
| 3,928,206 | A | * | 12/1975 | Waren | E02B 15/046 |
| | | | | | 210/776 |
| 3,931,740 | A | * | 1/1976 | Carter | G01N 1/10 |
| | | | | | 73/863.23 |
| 4,053,412 | A | * | 10/1977 | Stix | E04H 4/1263 |
| | | | | | 210/167.2 |
| 4,060,487 | A | * | 11/1977 | Samsel | E02B 15/046 |
| | | | | | 210/923 |
| 4,086,717 | A | * | 5/1978 | Aucoin, Jr. | A01K 74/00 |
| | | | | | 43/6.5 |
| 4,128,068 | A | * | 12/1978 | Ogura | B63B 35/32 |
| | | | | | 210/242.3 |
| 4,141,308 | A | * | 2/1979 | Gainey | E02B 15/10 |
| | | | | | 440/37 |
| 4,211,659 | A | * | 7/1980 | Nyfeldt | E02B 15/048 |
| | | | | | 210/923 |
| 4,258,534 | A | * | 3/1981 | Bryant | A01D 44/00 |
| | | | | | 56/9 |
| 4,264,444 | A | * | 4/1981 | Bronnec | E02B 15/046 |
| | | | | | 210/923 |
| 4,305,830 | A | * | 12/1981 | Shimura | E02B 15/108 |
| | | | | | 210/801 |
| 4,322,294 | A | * | 3/1982 | Price | E02B 15/104 |
| | | | | | 210/540 |
| 4,363,735 | A | * | 12/1982 | Hook | E02B 15/00 |
| | | | | | 210/776 |
| 4,509,286 | A | * | 4/1985 | John | A01K 73/00 |
| | | | | | 43/9.1 |
| 4,545,315 | A | * | 10/1985 | Becherer | B63B 35/32 |
| | | | | | 114/144 R |
| 4,663,879 | A | * | 5/1987 | Bergeron, Jr. | A01K 80/00 |
| | | | | | 43/4.5 |
| 4,674,984 | A | * | 6/1987 | Caddick | B63B 35/32 |
| | | | | | 165/44 |
| 4,839,062 | A | * | 6/1989 | Sanders | A01K 80/00 |
| | | | | | 210/776 |
| 4,882,073 | A | * | 11/1989 | Griffith | B01D 21/2433 |
| | | | | | 210/776 |
| 4,889,622 | A | * | 12/1989 | Newcombe-Bond | E04H 4/1263 |
| | | | | | 134/167 R |
| 4,900,432 | A | * | 2/1990 | Arnold | E04H 4/1263 |
| | | | | | 210/91 |
| 4,929,350 | A | * | 5/1990 | Wade | A01K 79/00 |
| | | | | | 210/242.1 |
| 5,022,987 | A | * | 6/1991 | Wells | E02B 15/046 |
| | | | | | 440/5 |
| 5,028,325 | A | * | 7/1991 | Hamilton | B63B 35/32 |
| | | | | | 210/242.1 |
| 5,043,060 | A | * | 8/1991 | Brennan | E04H 4/1609 |
| | | | | | 210/167.2 |
| 5,048,222 | A | * | 9/1991 | Correll | A01K 80/00 |
| | | | | | 43/104 |
| 5,106,492 | A | * | 4/1992 | Distinti | E04H 4/1263 |
| | | | | | 210/167.2 |
| 5,108,593 | A | * | 4/1992 | D'Ascensio | G01N 1/02 |
| | | | | | 210/242.1 |
| 5,128,031 | A | * | 7/1992 | Midkiff | B01D 35/05 |
| | | | | | 210/167.2 |
| 5,173,182 | A | * | 12/1992 | Debellian | E02B 15/046 |
| | | | | | 114/61.1 |
| 5,207,901 | A | * | 5/1993 | Ravagnan | B63B 35/32 |
| | | | | | 405/60 |
| 5,217,611 | A | * | 6/1993 | Ayroldi | E02B 15/047 |
| | | | | | 210/242.1 |
| 5,404,696 | A | * | 4/1995 | Vasby | A01D 44/00 |
| | | | | | 56/8 |
| 5,456,197 | A | * | 10/1995 | Kwok | E02B 15/046 |
| | | | | | 114/382 |
| 5,457,908 | A | * | 10/1995 | Sanders | A01K 71/00 |
| | | | | | 56/9 |
| 5,487,258 | A | * | 1/1996 | McNabb | A01D 44/00 |
| | | | | | 56/9 |
| 5,491,922 | A | * | 2/1996 | Sanders | A01K 80/00 |
| | | | | | 405/71 |
| 5,593,579 | A | * | 1/1997 | Reynolds | B01D 33/04 |
| | | | | | 210/242.1 |
| 5,738,036 | A | * | 4/1998 | Jones | B63B 35/14 |
| | | | | | 210/776 |
| 5,839,216 | A | * | 11/1998 | Baker | A01K 79/00 |
| | | | | | 43/6.5 |
| 5,863,440 | A | * | 1/1999 | Rink | C02F 1/681 |
| | | | | | 210/923 |
| 5,893,978 | A | * | 4/1999 | Yoda | C02F 7/00 |
| | | | | | 405/63 |
| 6,023,920 | A | * | 2/2000 | Penny | A01D 44/00 |
| | | | | | 56/8 |

(56) References Cited

U.S. PATENT DOCUMENTS

| | | | | | |
|---|---|---|---|---|---|
| 6,073,382 | A * | 6/2000 | Willener | A01K 79/00 |
| | | | | 210/776 |
| 6,074,553 | A * | 6/2000 | Haski | E04H 4/1263 |
| | | | | 210/167.2 |
| 6,115,954 | A * | 9/2000 | Willener | A01K 79/00 |
| | | | | 43/4.5 |
| 6,117,336 | A * | 9/2000 | Sachse | E03F 5/14 |
| | | | | 210/776 |
| 6,143,172 | A * | 11/2000 | Rink | B01D 17/0205 |
| | | | | 210/241 |
| 6,328,165 | B1 * | 12/2001 | Baker | A01K 79/00 |
| | | | | 43/4.5 |
| 6,357,213 | B1 * | 3/2002 | Dillingham | A01D 44/00 |
| | | | | 56/8 |
| 6,519,892 | B1 * | 2/2003 | Jaime | A01K 74/00 |
| | | | | 43/6.5 |
| 6,669,841 | B2 * | 12/2003 | Morin | B63B 35/32 |
| | | | | 210/242.1 |
| 6,832,465 | B2 * | 12/2004 | Horvath | A01B 35/00 |
| | | | | 56/9 |
| 7,037,038 | B1 * | 5/2006 | Haski | B60L 53/38 |
| | | | | 405/60 |
| 7,045,058 | B2 * | 5/2006 | Walczyk | E02B 15/048 |
| | | | | 210/242.1 |
| 7,101,475 | B1 * | 9/2006 | Maaske | E04H 4/1263 |
| | | | | 210/167.2 |
| 7,309,421 | B2 * | 12/2007 | Riley | C02F 1/001 |
| | | | | 210/167.2 |
| 7,314,571 | B2 * | 1/2008 | Lovestead | B01D 19/0057 |
| | | | | 210/776 |
| 7,452,461 | B2 * | 11/2008 | Riley | E04H 4/1636 |
| | | | | 210/167.2 |
| 7,452,462 | B2 * | 11/2008 | Joliet | B63B 35/32 |
| | | | | 210/923 |
| 7,485,235 | B2 * | 2/2009 | Kellett | B63B 35/32 |
| | | | | 210/776 |
| 7,504,025 | B2 * | 3/2009 | Burgassi | E04H 4/1654 |
| | | | | 210/167.2 |
| 7,504,027 | B2 * | 3/2009 | Cosentino | E04H 4/1263 |
| | | | | 210/167.2 |
| 7,958,705 | B1 * | 6/2011 | Bourque | A01D 44/00 |
| | | | | 56/8 |
| 8,381,500 | B2 * | 2/2013 | Grimes | A01D 44/00 |
| | | | | 56/8 |
| 9,150,286 | B2 * | 10/2015 | Siewert | B63B 35/32 |
| 9,290,242 | B2 * | 3/2016 | Kang | B03C 7/006 |
| 9,334,617 | B2 * | 5/2016 | Caraballo Benitez | B63B 35/32 |
| 9,493,215 | B2 * | 11/2016 | Horton | E02B 15/104 |
| 9,556,577 | B2 * | 1/2017 | Vaz Viegas | E02B 15/048 |
| 9,556,578 | B1 * | 1/2017 | LaMora, Jr. | E04G 21/3204 |
| 9,643,692 | B2 * | 5/2017 | Covington | E02B 15/046 |
| 9,776,136 | B2 * | 10/2017 | Meano, Sr. | C02F 1/441 |
| 9,776,692 | B2 * | 10/2017 | Merz | G01N 33/18 |
| 9,903,083 | B2 * | 2/2018 | Lindholm | B63B 35/32 |
| 9,976,271 | B2 * | 5/2018 | Casadio | E04H 4/1654 |
| 10,046,983 | B2 * | 8/2018 | De Luca | E02B 15/08 |
| 10,259,541 | B2 * | 4/2019 | Merz | G01N 33/18 |
| 10,293,895 | B2 * | 5/2019 | Covington | E02B 15/046 |
| 10,323,375 | B1 * | 6/2019 | Bates, Jr. | E02B 15/0835 |
| 10,323,376 | B1 * | 6/2019 | Nickelson | E02B 15/106 |
| 10,370,068 | B2 * | 8/2019 | Dieters | B63B 35/32 |
| 10,385,582 | B2 * | 8/2019 | Smith, Jr. | C02F 1/001 |
| 10,519,616 | B2 * | 12/2019 | Casadio | E02B 15/104 |
| 10,526,055 | B2 * | 1/2020 | Covington | C02F 1/40 |
| 10,602,663 | B2 * | 3/2020 | Szabo | A01M 21/02 |
| D887,658 | S * | 6/2020 | Smith, Jr. | D32/31 |
| 10,676,164 | B2 * | 6/2020 | Carlési | B63B 35/32 |
| 10,683,627 | B2 * | 6/2020 | Covington | E02B 15/0864 |
| 10,689,821 | B1 * | 6/2020 | Whittington | B63B 35/32 |
| 10,787,831 | B2 * | 9/2020 | Smith, Jr. | C02F 1/001 |
| 10,794,075 | B2 * | 10/2020 | Smith, Jr. | C02F 1/008 |
| 10,870,962 | B1 * | 12/2020 | Nickelson | E02B 15/106 |
| 10,900,187 | B1 * | 1/2021 | Gadh | E02B 15/048 |
| 11,001,351 | B1 * | 5/2021 | Aguilera | E02B 15/046 |
| 11,001,352 | B1 * | 5/2021 | Nassim | E02B 15/104 |
| 11,091,891 | B1 * | 8/2021 | Kelly | E02B 15/10 |
| 11,097,814 | B2 * | 8/2021 | Wang | E02B 15/104 |
| 11,097,815 | B2 * | 8/2021 | Hernández | B63B 35/32 |
| 11,112,799 | B2 * | 9/2021 | Simik | C02F 1/008 |
| D935,119 | S * | 11/2021 | Wu | D32/21 |
| 11,161,753 | B1 * | 11/2021 | Wang | C02F 1/001 |
| 11,247,926 | B2 * | 2/2022 | Edgell, II | B01D 29/6469 |
| 11,254,397 | B1 * | 2/2022 | Calvert | F27B 14/12 |
| 11,371,201 | B1 * | 6/2022 | Covington | E02B 15/048 |
| 11,396,731 | B2 * | 7/2022 | Ji | E02B 15/0807 |
| 11,414,824 | B2 * | 8/2022 | Bryzek | E02B 15/045 |
| 11,414,825 | B2 * | 8/2022 | Faizan | E02B 15/048 |
| 11,453,989 | B2 * | 9/2022 | Negron | E02B 15/10 |
| 11,470,830 | B1 * | 10/2022 | Bosteels | A01K 73/00 |
| 11,613,862 | B2 * | 3/2023 | Cui | B01D 33/155 |
| | | | | 210/170.09 |
| 11,629,471 | B2 * | 4/2023 | Marshall | E02B 15/104 |
| | | | | 210/747.6 |
| 11,649,021 | B2 * | 5/2023 | Spencer | G07C 5/008 |
| | | | | 701/21 |
| 11,661,156 | B2 * | 5/2023 | Svorcan | B63H 1/12 |
| | | | | 210/747.6 |
| 11,702,174 | B2 * | 7/2023 | Wu | E04H 4/1654 |
| | | | | 114/219 |
| 11,708,135 | B2 * | 7/2023 | Milanovich | B63B 35/32 |
| | | | | 210/768 |
| 11,772,753 | B2 * | 10/2023 | Dakhil | B63H 1/36 |
| | | | | 114/61.27 |
| 11,840,321 | B2 * | 12/2023 | Lordi | B63B 35/32 |
| 12,030,596 | B2 * | 7/2024 | Teshima | B63B 35/32 |
| 12,032,376 | B2 * | 7/2024 | Simik | G05D 1/0206 |
| 12,077,257 | B2 * | 9/2024 | Maydanik | B07B 1/005 |
| 12,077,258 | B2 * | 9/2024 | Na | B63B 27/10 |
| 12,083,564 | B2 * | 9/2024 | Gray | A01D 44/00 |
| 12,116,290 | B2 * | 10/2024 | Turner | B03D 1/1462 |
| 12,145,704 | B2 * | 11/2024 | Lordi | B63H 20/06 |
| 12,179,894 | B2 * | 12/2024 | Redburn | B63B 1/121 |
| 12,221,194 | B2 * | 2/2025 | Lee | E02B 15/104 |
| 12,241,216 | B2 * | 3/2025 | Covington | E02B 15/0864 |
| 12,263,922 | B2 * | 4/2025 | Campbell | C02F 1/40 |
| 12,275,167 | B1 * | 4/2025 | Cook | B02C 21/026 |
| 12,325,496 | B1 * | 6/2025 | Zhou | B63B 79/40 |
| 12,332,354 | B2 * | 6/2025 | Dokken | G01S 19/14 |
| 12,338,143 | B2 * | 6/2025 | Smith | C02F 1/32 |
| 12,359,385 | B2 * | 7/2025 | Kimpara | B63H 20/00 |
| 12,392,157 | B1 * | 8/2025 | Yang | C02F 1/001 |
| 12,435,480 | B2 * | 10/2025 | Campbell | B63B 25/00 |
| 12,448,802 | B1 * | 10/2025 | Zhong | E04H 4/1654 |
| 2003/0132154 | A1 * | 7/2003 | Morin | B63B 35/32 |
| | | | | 210/242.1 |
| 2005/0223965 | A1 * | 10/2005 | Austevoll | B63B 27/36 |
| | | | | 114/365 |
| 2006/0060513 | A1 * | 3/2006 | Craig | E04H 4/1263 |
| | | | | 210/167.2 |
| 2006/0065586 | A1 * | 3/2006 | Walczyk | E02B 15/048 |
| | | | | 210/242.1 |
| 2006/0096905 | A1 * | 5/2006 | Burgassi | E04H 4/1263 |
| | | | | 210/242.1 |
| 2006/0102532 | A1 * | 5/2006 | Cadotte, Jr. | B01D 21/0027 |
| | | | | 210/94 |
| 2006/0104720 | A1 * | 5/2006 | Haski | G05D 1/247 |
| | | | | 405/60 |
| 2006/0144774 | A1 * | 7/2006 | Joliet | B63B 35/32 |
| | | | | 210/242.1 |
| 2007/0151914 | A1 * | 7/2007 | Riley | C02F 1/001 |
| | | | | 210/242.1 |
| 2007/0158253 | A1 * | 7/2007 | Kellett | E02B 15/104 |
| | | | | 210/776 |
| 2010/0147781 | A1 * | 6/2010 | Newman | A01G 33/00 |
| | | | | 210/776 |
| 2011/0188934 | A1 * | 8/2011 | Heimtun | E02B 8/02 |
| | | | | 405/63 |
| 2012/0305461 | A1 * | 12/2012 | Veronie | E04H 4/1263 |
| | | | | 210/167.2 |

(56) References Cited

U.S. PATENT DOCUMENTS

| | | | | |
|---|---|---|---|---|
| 2014/0021113 A1* | 1/2014 | Caraballo Benitez | | E02B 15/105 |
| | | | | 210/170.11 |
| 2014/0165894 A1* | 6/2014 | Gastaldi | | B63B 35/32 |
| | | | | 114/61.27 |
| 2014/0197088 A1* | 7/2014 | Greve | | E02B 15/104 |
| | | | | 210/242.1 |
| 2014/0270972 A1* | 9/2014 | Siewert | | B63B 71/00 |
| | | | | 405/195.1 |
| 2014/0291254 A1* | 10/2014 | Frame | | E02B 15/00 |
| | | | | 210/241 |
| 2014/0367342 A1* | 12/2014 | Horton | | E02B 15/046 |
| | | | | 210/747.6 |
| 2015/0034565 A1* | 2/2015 | Vaz Viegas | | B63B 35/32 |
| | | | | 210/241 |
| 2015/0090646 A1* | 4/2015 | Sebo | | B63B 35/32 |
| | | | | 210/141 |
| 2015/0251733 A1* | 9/2015 | Kang | | B29B 17/0412 |
| | | | | 241/20 |
| 2016/0010300 A1* | 1/2016 | Pizzi | | E02B 15/104 |
| | | | | 210/396 |
| 2016/0017561 A1* | 1/2016 | Lindholm | | B63B 35/32 |
| | | | | 210/241 |
| 2016/0023718 A1* | 1/2016 | Siewert | | B63B 71/00 |
| | | | | 29/403.1 |
| 2016/0023724 A1* | 1/2016 | Menard | | B63B 1/125 |
| | | | | 114/61.1 |
| 2016/0114865 A1* | 4/2016 | Covington | | E02B 15/085 |
| | | | | 210/747.6 |
| 2016/0185618 A1* | 6/2016 | De Luca | | C02F 1/02 |
| | | | | 210/747.6 |
| 2016/0326035 A1* | 11/2016 | Heuser | | C02F 1/682 |
| 2017/0022728 A1* | 1/2017 | Simik | | G05D 1/43 |
| 2017/0051467 A1* | 2/2017 | Casadio | | E04H 4/1263 |
| 2017/0197689 A1* | 7/2017 | Covington | | E02B 15/085 |
| 2017/0217547 A1* | 8/2017 | Covington | | E02B 15/047 |
| 2017/0297671 A1* | 10/2017 | LaMora, Jr. | | B63B 35/32 |
| 2018/0238009 A1* | 8/2018 | Casadio | | E04H 4/1654 |
| 2019/0009867 A1* | 1/2019 | Dieters | | B63B 25/004 |
| 2019/0048608 A1* | 2/2019 | Smith, Jr. | | B01D 29/014 |
| 2019/0301188 A1* | 10/2019 | Smith, Jr. | | E04H 4/1263 |
| 2019/0338481 A1* | 11/2019 | Covington | | E02B 15/0864 |
| 2020/0002208 A1* | 1/2020 | Edgell | | B01D 36/04 |
| 2020/0086955 A1* | 3/2020 | Carlési | | E02B 15/101 |
| 2020/0180737 A1* | 6/2020 | Menard | | E02B 15/046 |
| 2021/0107608 A1* | 4/2021 | Spencer | | B63H 11/00 |
| 2021/0129948 A1* | 5/2021 | Wang | | B63B 35/32 |
| 2021/0139113 A1* | 5/2021 | Aguilera | | B63B 35/32 |
| 2021/0197932 A1* | 7/2021 | Wu | | B63B 35/32 |
| 2021/0214055 A1* | 7/2021 | Maydanik | | E02B 15/046 |
| 2021/0276672 A1* | 9/2021 | Lin | | B63B 35/32 |
| 2021/0382485 A1* | 12/2021 | Simik | | G05D 1/43 |
| 2022/0024551 A1* | 1/2022 | Lordi | | B63B 35/32 |
| 2022/0041256 A1* | 2/2022 | Svorcan | | E02B 15/105 |
| 2022/0055720 A1* | 2/2022 | Dakhil | | B63H 21/17 |
| 2022/0056655 A1* | 2/2022 | Covington | | E02B 15/10 |
| 2022/0080480 A1* | 3/2022 | Gray | | A01D 44/00 |
| 2022/0126955 A1* | 4/2022 | Pleasant | | B63B 35/32 |
| 2022/0136196 A1* | 5/2022 | Covington | | E02B 15/046 |
| | | | | 114/61.27 |
| 2022/0161902 A1* | 5/2022 | Teshima | | E02B 15/106 |
| 2022/0177082 A1* | 6/2022 | Na | | B63B 35/32 |
| 2022/0266961 A1* | 8/2022 | Milanovich | | B29B 17/0408 |
| 2022/0274852 A1* | 9/2022 | Turner | | B03D 1/1431 |
| 2022/0275594 A1* | 9/2022 | Cui | | E02B 15/10 |
| 2022/0333326 A1* | 10/2022 | Kimpara | | B63H 20/00 |
| 2022/0341114 A1* | 10/2022 | Shibayama | | B01D 21/265 |
| 2022/0363353 A1* | 11/2022 | Campbell | | E02B 15/0842 |
| 2022/0381760 A1* | 12/2022 | Kang | | G05D 1/0206 |
| 2023/0065821 A1* | 3/2023 | Marshall | | E02B 15/048 |
| 2023/0067954 A1* | 3/2023 | Marshall | | B63B 35/32 |
| 2023/0082558 A1* | 3/2023 | Gray | | E02B 15/10 |
| | | | | 56/8 |
| 2023/0202622 A1* | 6/2023 | Lee | | B63B 35/44 |
| 2023/0202623 A1* | 6/2023 | Hyde | | B63G 8/39 |
| | | | | 114/256 |
| 2023/0249787 A1* | 8/2023 | Spencer | | G05D 1/0038 |
| | | | | 114/31 |
| 2023/0399806 A1* | 12/2023 | Campbell | | E02B 15/104 |
| 2024/0034442 A1* | 2/2024 | Covington | | E02B 15/046 |
| 2024/0059385 A1* | 2/2024 | Lordi | | B63H 20/10 |
| 2024/0083556 A1* | 3/2024 | Wu | | B63B 79/40 |
| 2024/0189834 A1* | 6/2024 | Mochizuki | | B03C 1/30 |
| 2024/0426069 A1* | 12/2024 | Carlési | | E02B 15/046 |
| 2025/0033752 A1* | 1/2025 | Lordi | | B63H 20/06 |
| 2025/0115337 A1* | 4/2025 | Garver | | B63B 35/32 |
| 2025/0187707 A1* | 6/2025 | Han | | B63B 35/32 |
| 2025/0236364 A1* | 7/2025 | Basile | | B63B 35/32 |

* cited by examiner

WATER SURFACE FLOATER COLLECTING SHIP

CROSS-REFERENCE TO RELATED APPLICATIONS

This application claims priority of Chinese Patent Application No. 202211110762.8, filed on Sep. 13, 2022, the entire contents of which are incorporated herein by reference.

TECHNICAL FIELD

The present invention relates to the technical field of water surface waste treatment, and in particular to a water surface floater collecting ship.

BACKGROUND

At present, various kinds of parks and tourist attractions are provided with large and small lakes. With the frequent human activities, debris may fall into a water body from time to time, which will not only result in aesthetic problems, but also cause pollution to the environment if left untreated for a long time. At present, two kinds of mechanical methods are mainly adopted to salvage floaters on water surface, one is conveying type salvage, and the other is self-flow type salvage, both of which have their advantages.

In an existing Chinese patent: (CN111926793B) a water surface floater collecting device and collecting ship, by making floaters flow automatically to a storage compartment, a picking up device is omitted. However, the floaters need to be picked up manually in multiple times, and the collected floaters need to be transferred to the ship, which wastes a lot of manpower and time. In addition, when the floaters are transferred in multiple times, disturbance of water surface are caused, which makes the floaters on water surface float further away with water waves, so the moving distance of the ship is increased, and the cost of fuel consumption is increased. Moreover, in order to avoid traveling for multiple times, the ship will generally store a certain amount of waste before returning to the shore and unloading the waste, which means that people need to spend a lot of time with the floaters onboard, and the odor emitted by the floating waste will pollute the environment, reduce the work efficiency, and indirectly affect the floater salvage efficiency.

SUMMARY

In order to overcome the defects that picking up floaters with the cooperation of labors consumes manpower and causes disturbance of water surface, which makes the floaters float further away with water waves, and the odor emitted by the collected floating waste will pollute the environment and affect the salvage efficiency, the present invention provides a water surface floater collecting ship.

The technical solution is: a water surface floater collecting ship, comprising a hull, a fuel tank, an automatic navigator and a driving assembly; wherein the fuel tank is installed on the right part of the hull; the automatic navigator is installed on the right part of the hull; the automatic navigator is located in front of the fuel tank; the driving assembly is installed on the left part of the hull; the left part of the hull is fixedly connected with a first sealing plate and a water baffle plate in sequence; the hull is divided into a power compartment, a drainage compartment and a temporary storage compartment in sequence by the first sealing plate and the water baffle plate; two through holes oblique to the right are formed in the drainage compartment, and the drainage compartment is in communication with a water body through the two through holes; the driving assembly is located in the power compartment; an output end of the driving assembly is in communication with the drainage compartment through a water pipe; the present invention also comprises a collecting system, a dreg filter system and a pushing unit; the left part of the hull is connected with the collecting system used for collecting waste, the collecting system is connected with the dreg filter system used for separating floating waste from water and draining the floating waste; the dreg filter system is connected with the hull; the left part of the hull is connected with the pushing unit used for compressing the waste onboard; and the collecting system is connected with the dreg filter system.

As an improvement of the above technical solution, the collecting system is composed of a self-flow frame, a counterweight, a self-flow unit and a self-sealing unit; the left part of the hull is connected with the self-flow unit used for collecting floaters; the left part of the self-flow unit is connected with the self-flow frame; a limit part is arranged on each of the four corners of the inner surface of the self-flow frame; two rows of symmetrical seepage holes are formed in the bottom of the self-flow frame; the lower part of the outer surface of the self-flow frame is fixedly connected with the counterweight; the inner part of the self-flow frame is connected with the self-sealing unit; an input end of the driving assembly is in communication with the self-flow frame through a water pipe; the self-flow unit comprises support beams, first electric actuators, transverse plates and support rods; the left part of the hull is fixedly connected with two symmetrically arranged support beams; the two support beams are connected with the dreg filter system; a first electric actuator is installed on the left part of each support beam; the telescopic parts of the two first electric actuators are respectively and fixedly connected with a transverse plate; the lower parts of the two transverse plates are respectively and fixedly connected with a support rod; the two support rods are jointly connected with the dreg filter system; and the lower parts of the two support rods are jointly and fixedly connected with the self-flow frame.

As an improvement of the above technical solution, the self-sealing unit comprises connecting rods, taper rods and a second sealing plate; the front part and the rear part of the inner surface of the self-flow frame are respectively and fixedly connected with a connecting rod; the connecting rods are connected with the dreg filter system; the lower surfaces of the two connecting rod are fixedly connected with a plurality of taper rods; each taper rod is in correspondence to a seepage hole; the second sealing plate is movably arranged in the self-flow frame; two rows of taper holes are symmetrically formed in the second sealing plate; each row of taper holes are in correspondence to one row of seepage holes; and each taper rod passes through one taper hole.

As an improvement of the above technical solution, the dreg filter system is composed of a diversion member, a filter unit, a discharging unit and a transfer unit; the two support rods are jointly connected with the filter unit used for separating floating waste from water; the lower part of the filter unit is connected with the connecting rods; the filter unit is connected with the discharging unit used for discharging floating waste; the left part of the hull is connected with the transfer unit used for draining the floating waste and transferring the floating waste to the temporary storage compartment; the water baffle plate is fixedly connected with the diversion member; he diversion member is located below the transfer unit; the two support beams are connected with the transfer unit; the filter unit comprises second electric actuators, T-plates, pull ropes, an upper aerial trap frame, a lower aerial trap frame and elastic ropes; a second electric actuator is installed in each support rod; the telescopic parts of the two second electric actuators are respectively and fixedly connected with a T-plate; the left parts and the right parts of the two T-plates (302) are respectively connected with a pull rope; the lower parts of the four pull ropes are jointly connected with the upper aerial trap frame; the upper aerial trap frame is connected with the lower aerial trap frame through a catch net; the lower aerial trap frame is connected with the discharging unit; the lower aerial trap frame is connected with two symmetrical aerial trap bottoms; a straight slot is respectively formed in the left part and the right part of the lower aerial trap frame; the front part and the rear part of the lower aerial trap frame are respectively connected with two elastic ropes; and the lower parts of two adjacent elastic ropes are jointly connected with a connecting rod.

As an improvement of the above technical solution, the discharging unit comprises racks, transverse rods, electric telescopic rods and gears; a rack is respectively installed on the left part and the right part of the lower aerial trap frame; the lower aerial trap frame is slidably connected with two symmetrically arranged transverse rods through connecting blocks; the back sides of the two transverse rods are respectively connected with an aerial trap bottom; two electric telescopic rods are installed in each straight slot; the telescopic parts of the two electric telescopic rods in the front are jointly and fixedly connected with one transverse rod through connecting blocks; the telescopic parts of the two electric telescopic rods in the rear are jointly and fixedly connected with the other transverse rod through connecting blocks; the left part and the right part of each transverse rod are respectively and fixedly connected with a gear; and the upper parts of two adjacent gears are engaged with a rack.

As an improvement of the above technical solution, the transfer unit comprises electric sliding rails, electric sliding blocks, suspension frames, a first conveyor assembly and a second conveyor assembly; an electric sliding rail is installed on the upper part of each support beam; the two electric sliding rails are respectively connected with an electric sliding block; the two electric sliding blocks are respectively and fixedly connected with a suspension frame; the lower parts of the two suspension frames are jointly and fixedly connected with the first conveyor assembly; the right part of the hull is fixedly connected with the second conveyor assembly; the second conveyor assembly is located below the first conveyor assembly; and the first conveyor assembly is located above the diversion member.

As an improvement of the above technical solution, the pushing unit comprises third electric actuators, a pushing plate and rotating plates; two symmetrically arranged third electric actuators are installed on the left part of the hull; the telescopic parts of the two third electric actuators are jointly and fixedly connected with the pushing plate; the lower part of the pushing plate is slidably connected with the hull; and the front part and the rear part of the pushing plate are respectively and movably connected with a rotating plate.

As an improvement of the above technical solution, the second sealing plate is made of a foam floating material.

As an improvement of the above technical solution, the first conveyor assembly and the second conveyor assembly are electric conveyor belts, and a plurality of water permeable holes are formed in the conveying surfaces thereof.

As an improvement of the above technical solution, when the pushing plate moves to the right, neither of the rotating plates rotates; when the pushing plate moves to the left, both of the rotating plates rotate; and the two rotating plates are folded in a wing shape.

The present invention has the following beneficial effects: in the present invention, the top of the self-flow frame is lower than the water surface, so the water in a water region can flow automatically towards the self-flow frame, and water surface floaters are driven by the water to move towards the self-flow frame and finally fall into an aerial trap enclosed by the upper aerial trap frame and the lower aerial trap frame in the self-flow frame; the water in the self-flow frame is continuously pumped out by the driving assembly through a water pipe to make the liquid level in the self-flow frame always lower than the water surface, the water pumped out is drained into the drainage compartment by the output end of the driving assembly through a water pipe, the drainage compartment is in communication with the water in the water region through the two oblique holes, and the water is directly drained by the drainage compartment under water surface, so the problem that the water surface floaters float away due to the disturbance of the water surface caused by drainage is avoided, and the treatment process of floating waste on the water surface is efficient and simple.

In the present invention, the two transverse rods are rotated by the connecting blocks in the process of moving away from each other, so each aerial trap bottom is rolled up by one of the two transverse rods respectively in a reel winding mode, which effectively prevents the floating waste from hanging on the aerial trap bottoms, realizes automatic collection of the floating waste, effectively reduces the number of manual operations, and saves the labor cost.

In the present invention, the pushing plate and the two rotating plates are controlled to move to the right; as the two rotating plates do not rotate when moving to the right, the floating waste unloaded from the second conveyor assembly is pushed to the right by the pushing plate and the two rotating plates together, and the floating waste is effectively compressed by the mutual extrusion of the floating waste, which reduces the space occupied by the floating waste, increases the containment efficiency of the collecting ship, reduces the frequency of the collecting ship moving to and from a shore to unload the floating waste, and is favorable for improving the working efficiency; the automatic navigator is controlled to control the hull to move to a water region to be treated, and then the water surface floaters are collected by remote control, which reduces the long-time contact between people and the floating waste.

REFERENCE SIGNS

Figure 1:
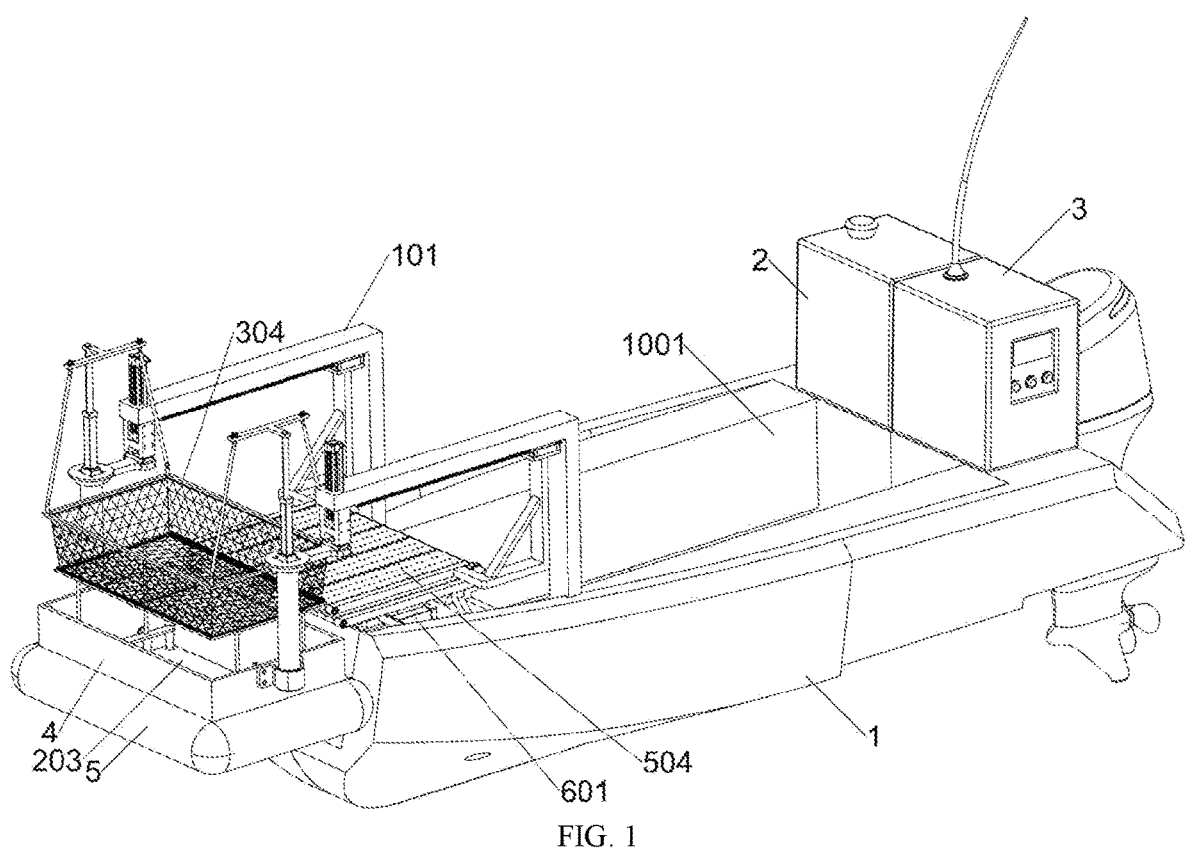
FIG. 1 is a three-dimensional structural schematic diagram of a water surface floater collecting ship of the present invention.
Figure 2:
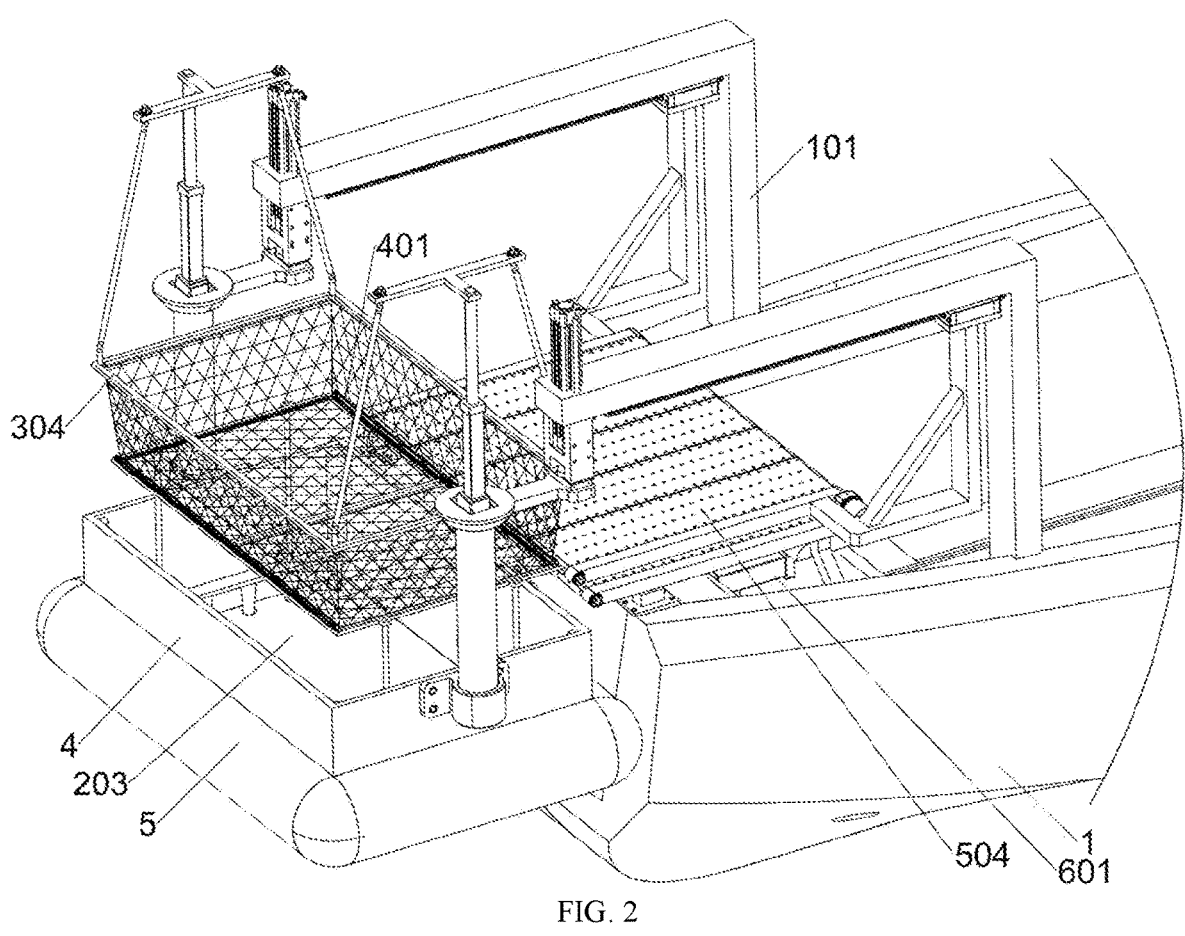
FIG. 2 is a local three-dimensional structural schematic diagram of a water surface floater collecting ship of the present invention.
Figure 3:
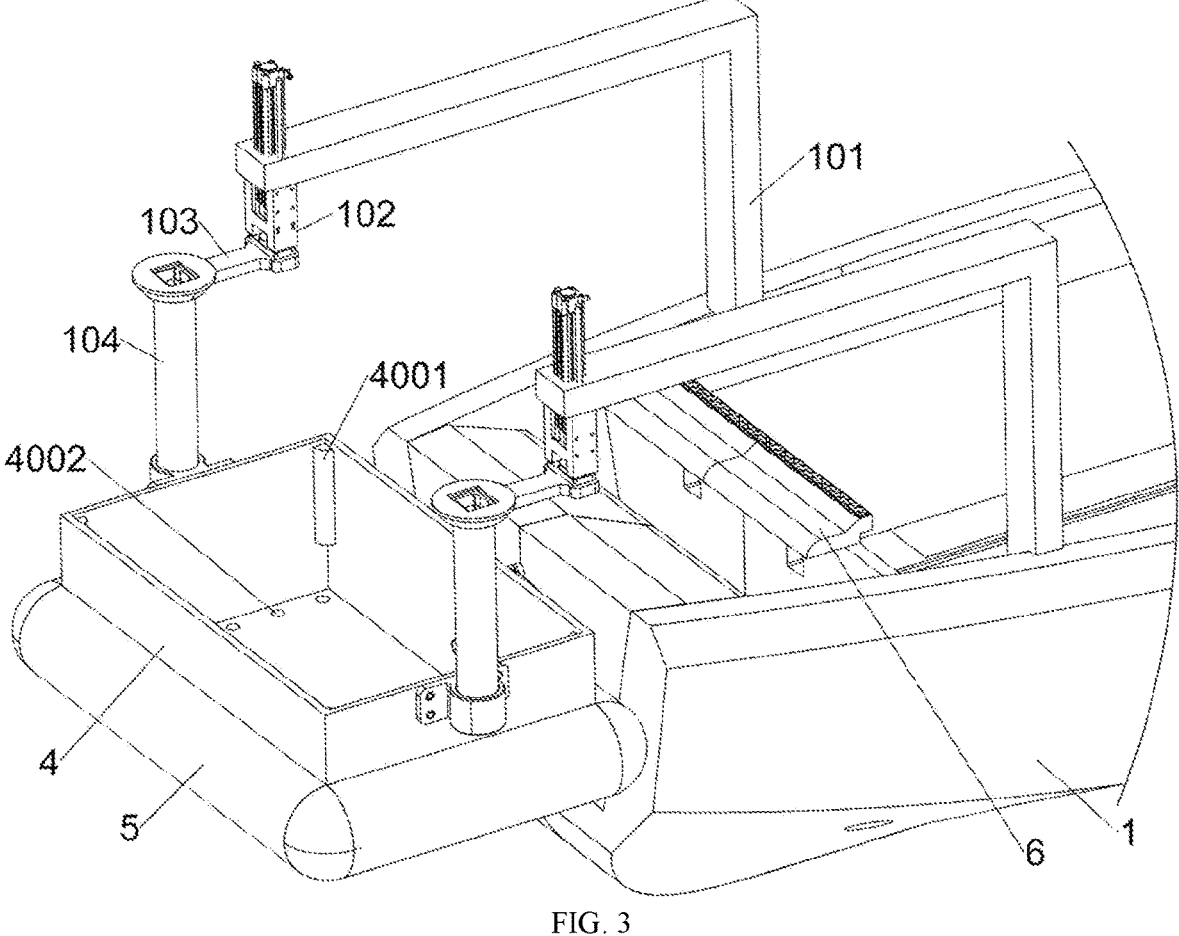
FIG. 3 is a three-dimensional structural schematic diagram of a self-flow unit of a water surface floater collecting ship of the present invention.
Figure 4:
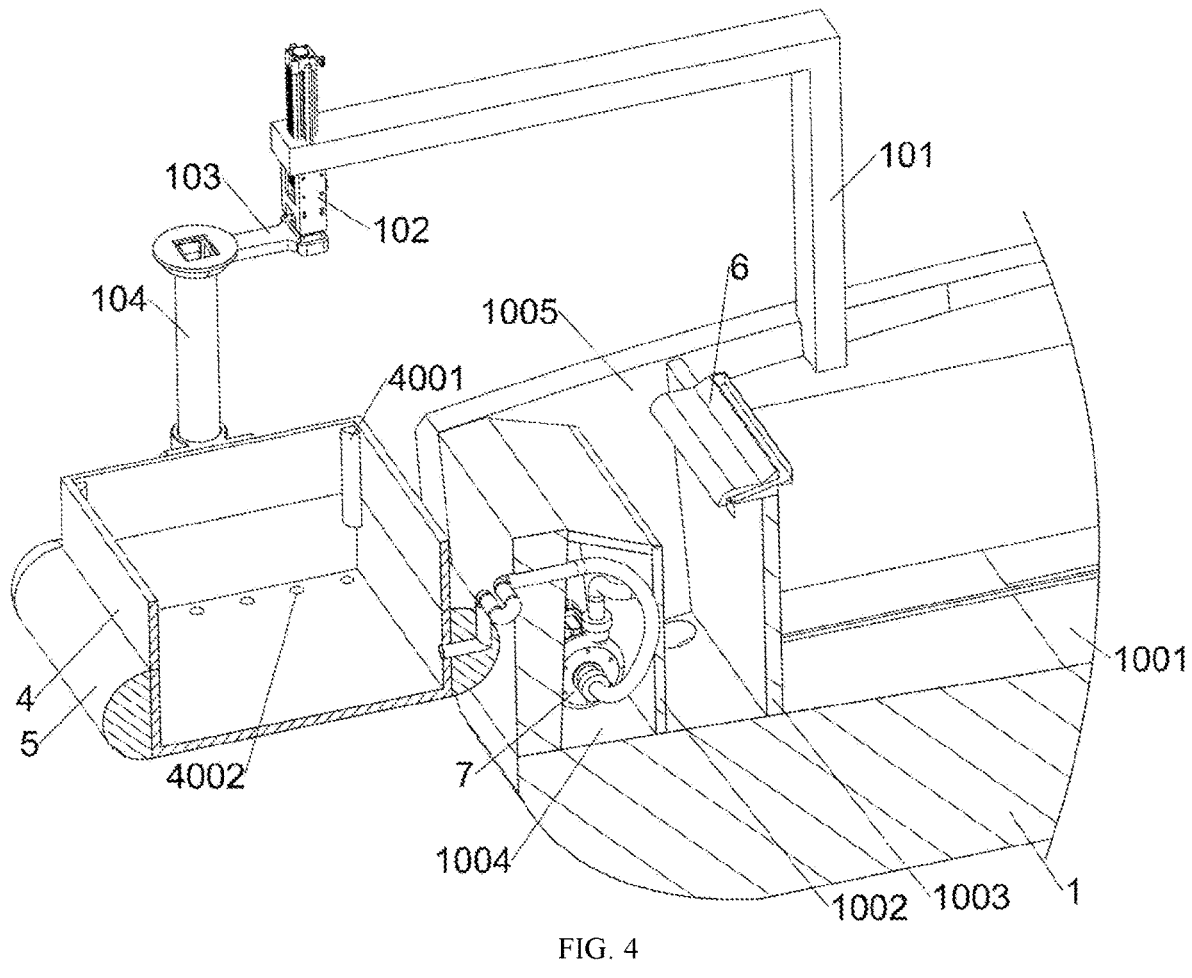
FIG. 4 is a sectional view of a self-flow unit of a water surface floater collecting ship of the present invention.

1—hull, 2—full tank, 3—automatic navigator, 4—self-flow frame, 5—counterweight, 6—diversion member, 7—driving assembly, 1001—temporary storage compartment, 1002—first sealing plate, 1003—water baffle plate, 1004—power compartment, 1005—drainage compartment, 4001—limit part, 4002—seepage hole, 101—support beam, 102—first electric actuator, 103—transverse plate, 104—support rod, 201—connecting rod, 202—taper rod, 203—second sealing plate, 20301—taper hole, 301—second electric actuator, 302—T-plate, 303—pull rope, 304—upper aerial trap frame, 305—lower aerial trap frame, 306—elastic rope, 30501—aerial trap bottom, 30502—straight slot, 401—rack, 402—transverse rod, 403—electric telescopic rod, 404—gear, 501—electric sliding rail, 502—electric sliding block, 503—suspension frame, 504—first conveyor assembly, 505—second conveyor assembly, 601—third electric actuator, 602—pushing plate, and 603—rotating plate.

DETAILED DESCRIPTION

The present invention is further described in combination with the drawings and specific embodiments.

Embodiment 1

A water surface floater collecting ship, as shown in FIGS. 1-13, comprising a hull 1, a fuel tank 2, an automatic navigator 3 and a driving assembly 7; wherein the fuel tank 2 is installed on the right part of the hull 1; the automatic navigator 3 is installed on the right part of the hull 1; the automatic navigator 3 is located in front of the fuel tank 2; the driving assembly 7 is installed on the left part of the hull 1; the left part of the hull 1 is welded with a first sealing plate 1002 and a water baffle plate 1003 in sequence; the hull 1 is divided into a power compartment 1004, a drainage compartment 1005 and a temporary storage compartment 1001 in sequence by the first sealing plate 1002 and the water baffle plate 1003; two through holes oblique to the right are formed in the drainage compartment 1005, and the drainage compartment 1005 is in communication with a water body through the two through holes; the driving assembly 7 is located in the power compartment 1004; and an output end of the driving assembly 7 is in communication with the drainage compartment 1005 through a water pipe;

The present invention also comprises a collecting system, a dreg filter system and a pushing unit; the left part of the hull 1 is connected with the collecting system; the collecting system is connected with the dreg filter system; the dreg filter system is connected with the hull 1; the left part of the hull 1 is connected with the pushing unit; and the collecting system is connected with the dreg filter system. The hull 1 is controlled to move to a water region to be treated, and the collecting system is lowered below water surface, then water flows automatically towards the collecting system and drives water surface floaters to enter the collecting system; water in the collecting system is continuously pumped out by the driving assembly 7 and drained into the water body through the through holes preformed in the hull 1, which reduces the disturbance of the water surface; the liquid level in the collecting system is lower than the water surface, so the collecting process is continued; the floaters are separated from the water by the dreg filter system in the collecting system, and is drained and transferred to the hull 1; floating waste is pushed towards the right side of the hull 1 by the pushing unit to reduce the accumulation of the floating waste at a discharge port; and the floating waste is compressed to reduce the space occupied by the floating waste, and reduce the time and fuel consumed by the collecting ship during moving to and from a shore to unload the floating waste.

As shown in FIG. 1 and FIGS. 3-5, the collecting system is composed of a self-flow frame 4, a counterweight 5, a self-flow unit and a self-sealing unit; the left part of the hull 1 is connected with the self-flow unit; the left part of the self-flow unit is connected with the self-flow frame 4; a limit part 4001 is arranged on each of the four corners of the inner surface of the self-flow frame 4; two rows of symmetrical seepage holes 4002 are formed in the bottom of the self-flow frame 4; the lower part of the outer surface of the self-flow frame 4 is fixedly connected with the counterweight 5; the inner part of the self-flow frame 4 is connected with the self-sealing unit; and an input end of the driving assembly 7 is in communication with the self-flow frame 4 through a water pipe;

The self-flow unit comprises support beams 101, first electric actuators 102, transverse plates 103 and support rods 104; the left part of the hull 1 is welded with two symmetrically arranged support beams 101; the two support beams 101 are connected with the dreg filter system; a first electric actuator 102 is installed on the left part of each support beam 101; the telescopic parts of the two first electric actuators 102 are respectively and fixedly connected with a transverse plate 103; the lower parts of the two transverse plates 103 are respectively welded with a support rod 104; the two support rods 104 are jointly connected with the dreg filter system; and the lower parts of the two support rods 104 are jointly connected with the self-flow frame 4 through bolts.

The first electric actuators 102 are electric push rods.

Figure 5:
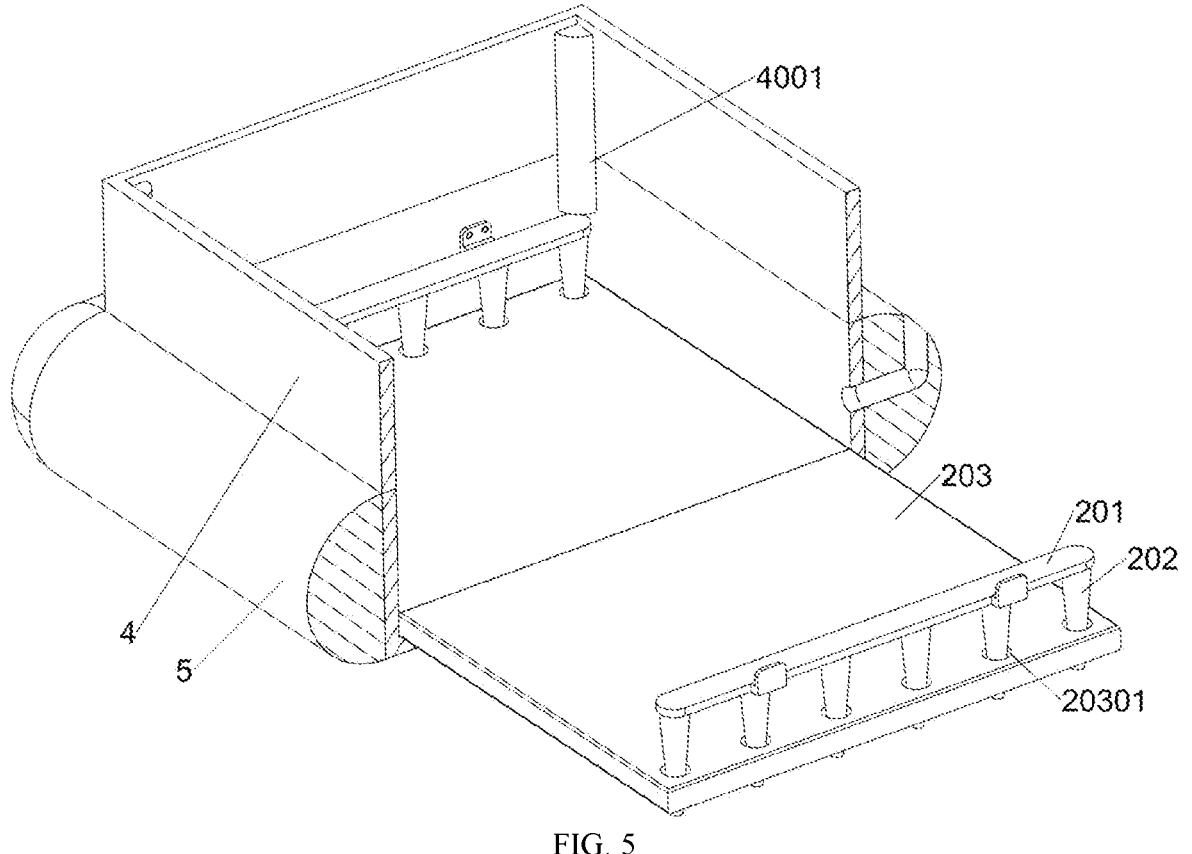
FIG. 5 is a three-dimensional structural schematic diagram of a self-sealing unit of a water surface floater collecting ship of the present invention.
Figure 6:
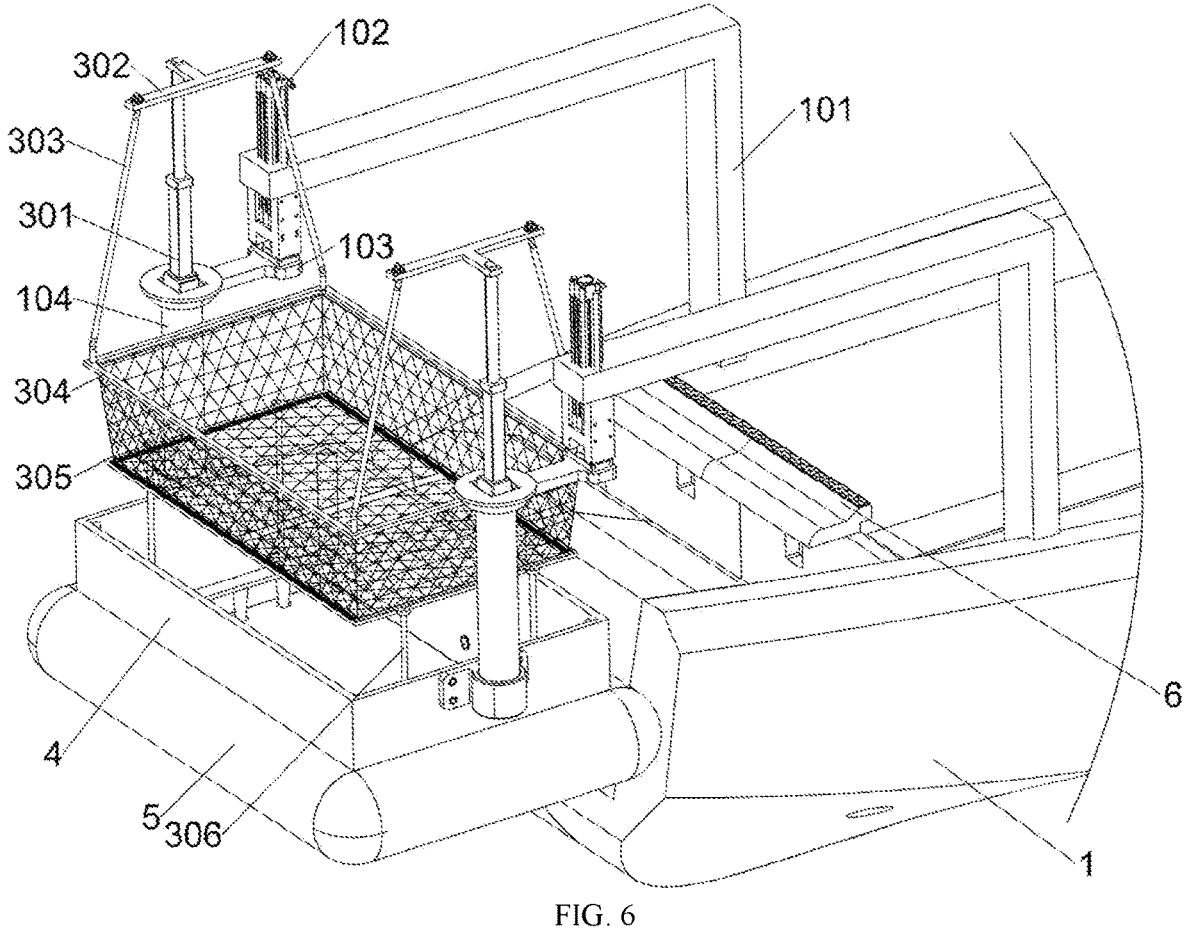
FIG. 6 is a first three-dimensional structural schematic diagram of a filter unit of a water surface floater collecting ship of the present invention.

As shown in FIG. 1 and FIG. 5, the self-sealing unit comprises connecting rods 201, taper rods 202 and a second sealing plate 203; the front part and the rear part of the inner surface of the self-flow frame 4 are respectively connected with a connecting rod 201 through bolts; the connecting rods 201 are connected with the dreg filter system; the lower surfaces of the two connecting rod 201 are welded with a plurality of taper rods 202; each taper rod 202 is in correspondence to a seepage hole 4002; the second sealing plate 203 is movably arranged in the self-flow frame 4; two rows of taper holes 20301 are symmetrically formed in the second sealing plate 203; each row of taper holes 20301 are in correspondence to one row of seepage holes 4002; and each taper rod 202 passes through one taper hole 20301.

The second sealing plate 203 is made of a foam floating material.

As shown in FIG. 1 and FIGS. 6-11, the dreg filter system is composed of a diversion member 6, a filter unit, a discharging unit and a transfer unit; the two support rods 104 are jointly connected with the filter unit; the lower part of the filter unit is connected with the connecting rods 201; the filter unit is connected with the discharging unit; the left part of the hull 1 is connected with the transfer unit; the water baffle plate 1003 is fixedly connected with the diversion member 6; he diversion member 6 is located below the transfer unit; and the two support beams 101 are connected with the transfer unit;

The filter unit comprises second electric actuators 301, T-plates 302, pull ropes 303, an upper aerial trap frame 304, a lower aerial trap frame 305 and elastic ropes 306; a second electric actuator 301 is installed in each support rod 104; the telescopic parts of the two second electric actuators 301 are respectively and fixedly connected with a T-plate 302; the left parts and the right parts of the two T-plates 302 are respectively connected with a pull rope 303; the lower parts of the four pull ropes 303 are jointly connected with the upper aerial trap frame 304; the upper aerial trap frame 304 is connected with the lower aerial trap frame 305 through a catch net; the lower aerial trap frame 305 is connected with the discharging unit; the lower aerial trap frame 305 is connected with two symmetrical aerial trap bottoms 30501; a straight slot 30502 is respectively formed in the left part and the right part of the lower aerial trap frame 305; the front part and the rear part of the lower aerial trap frame 305 are respectively connected with two elastic ropes 306; and the lower parts of two adjacent elastic ropes 306 are jointly connected with a connecting rod 201.

The second electric actuators 301 are electric push rods.

Figures 7, 8:
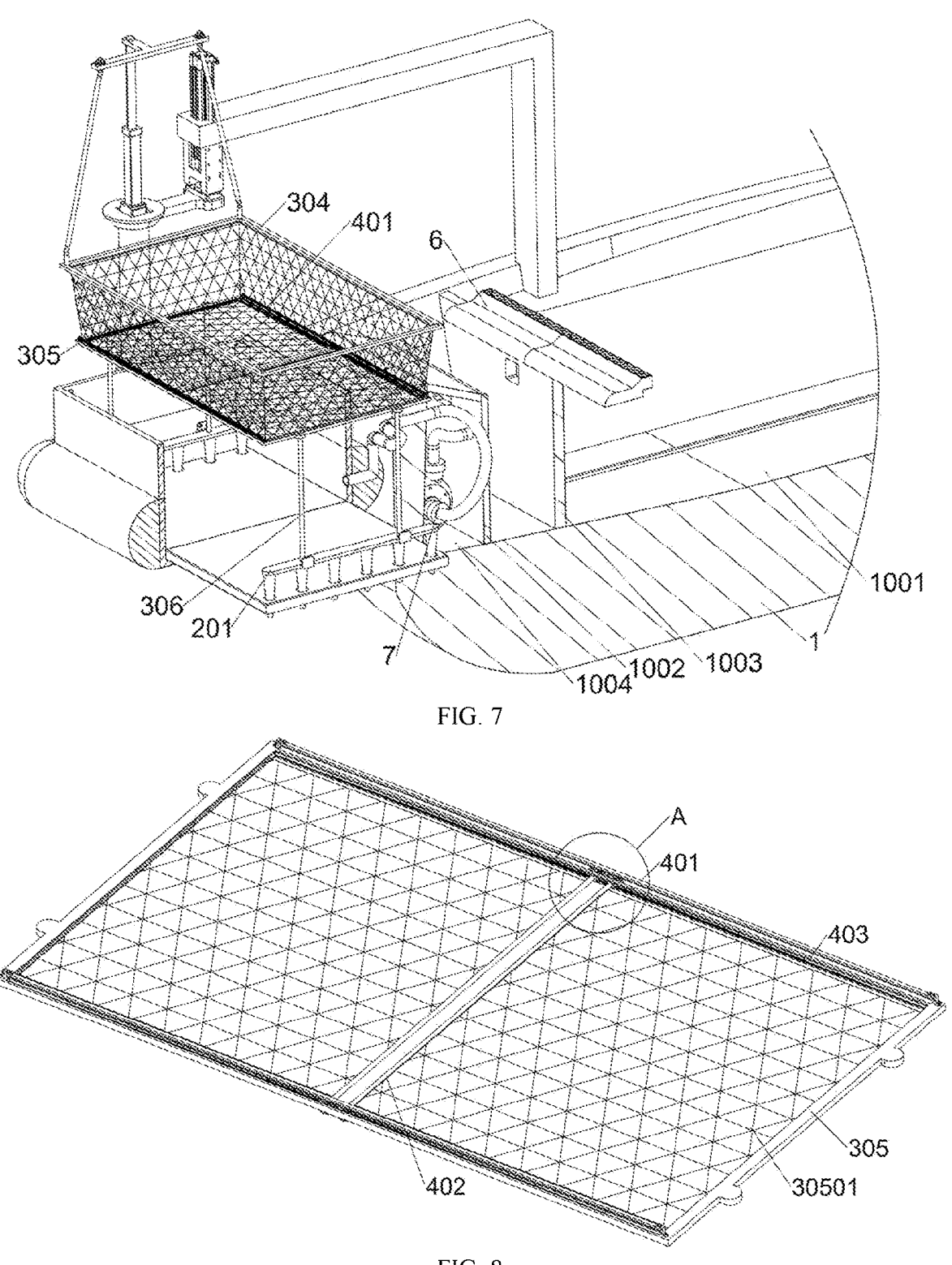
FIG. 7 is a first combined three-dimensional structural schematic diagram of a water surface floater collecting ship of the present invention.
FIG. 8 is a three-dimensional structural schematic diagram of a discharging unit of a water surface floater collecting ship of the present invention.
Figure 9:
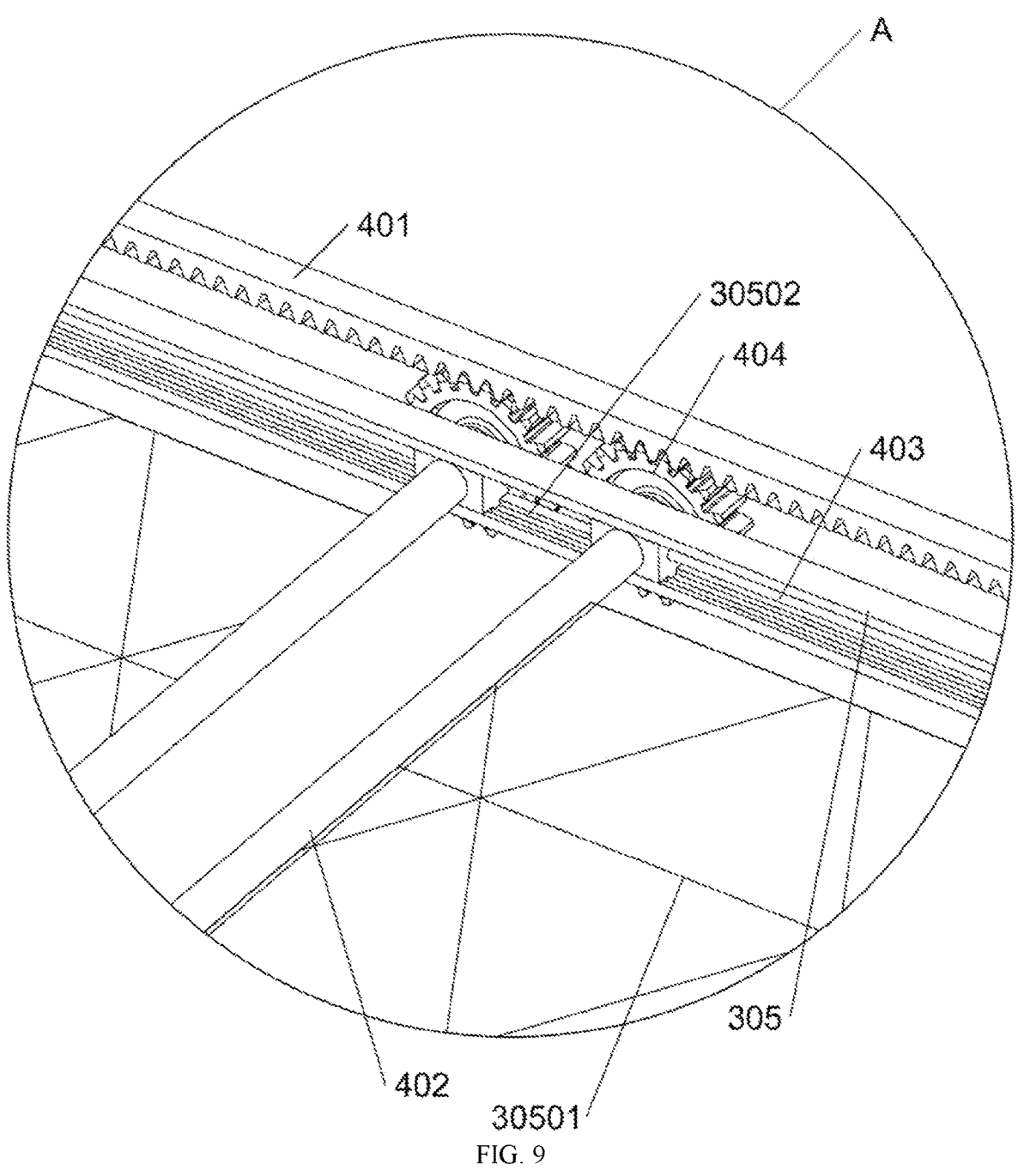
FIG. 9 is an enlarged three-dimensional structural schematic diagram of Detail A of a water surface floater collecting ship of the present invention.

As shown in FIG. 1 and FIGS. 8-9, the discharging unit comprises racks 401, transverse rods 402, electric telescopic rods 403 and gears 404; a rack 401 is respectively installed on the left part and the right part of the lower aerial trap frame 305; the lower aerial trap frame 305 is slidably connected with two symmetrically arranged transverse rods 402 through connecting blocks; the back sides of the two transverse rods 402 are respectively connected with an aerial trap bottom 30501; two electric telescopic rods 403 are installed in each straight slot 30502; the telescopic parts of the two electric telescopic rods 403 in the front are jointly and fixedly connected with one transverse rod 402 through connecting blocks; the telescopic parts of the two electric telescopic rods 403 in the rear are jointly and fixedly connected with the other transverse rod 402 through connecting blocks; the left part and the right part of each transverse rod 402 are respectively and fixedly connected with a gear 404; and the upper parts of two adjacent gears 404 are engaged with a rack 401.

Figure 10:
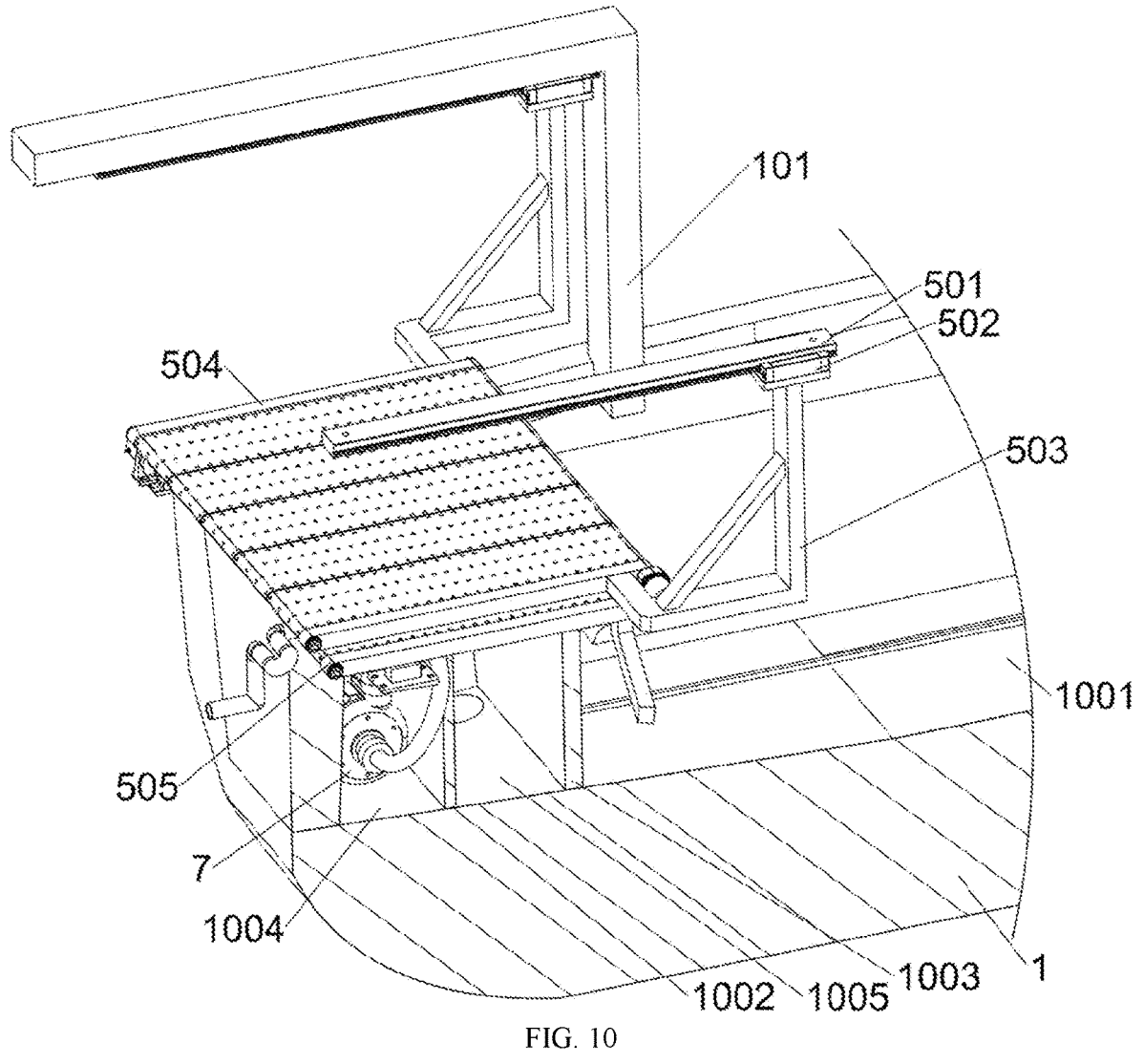
FIG. 10 is a three-dimensional structural schematic diagram of a transfer unit of a water surface floater collecting ship of the present invention.
Figures 11, 12:
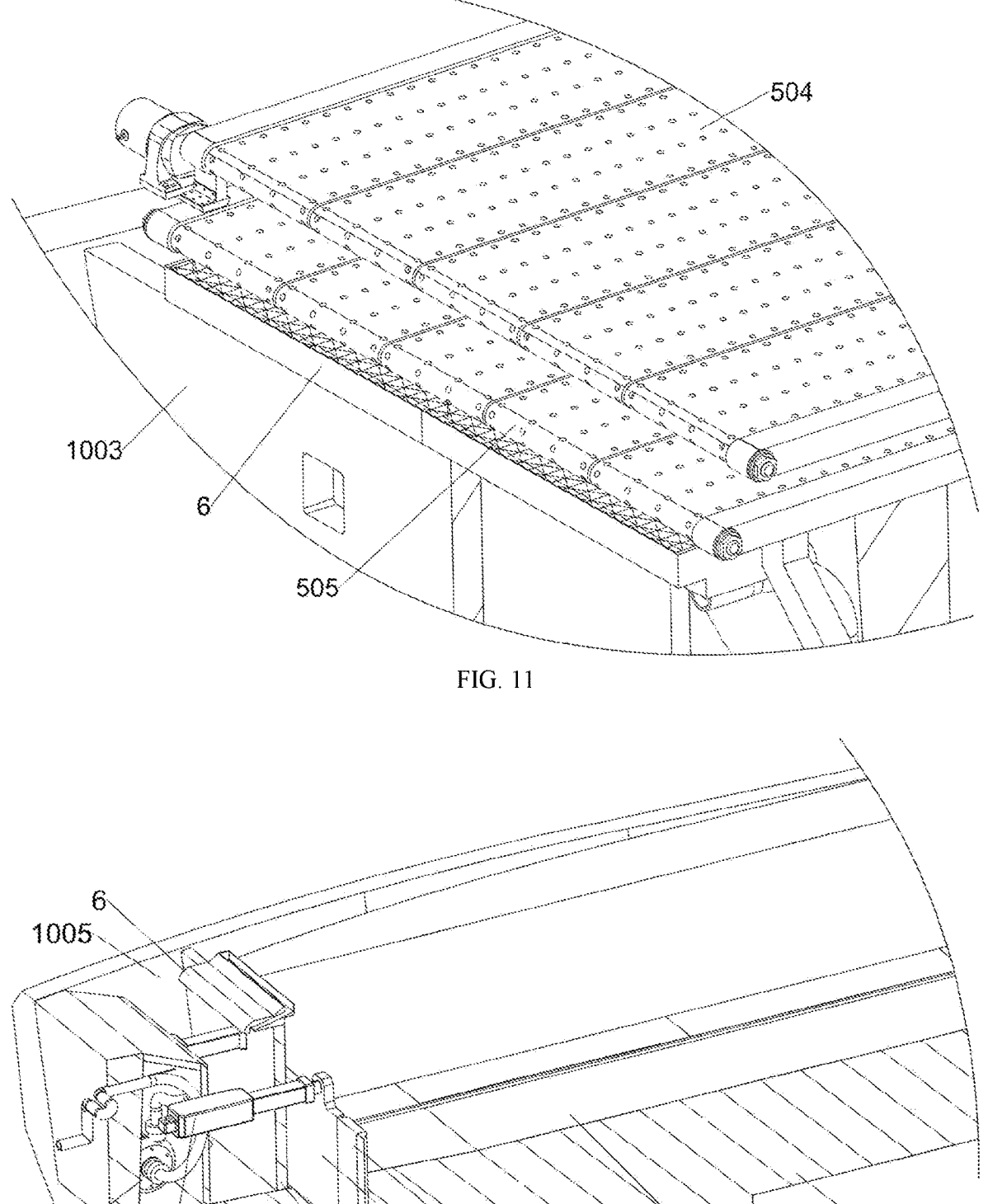
FIG. 11 is a second combined three-dimensional structural schematic diagram of a water surface floater collecting ship of the present invention.
FIG. 12 is a third combined three-dimensional structural schematic diagram of a water surface floater collecting ship of the present invention.

As shown in FIG. 1 and FIGS. 10-11, the transfer unit comprises electric sliding rails 501, electric sliding blocks 502, suspension frames 503, a first conveyor assembly 504 and a second conveyor assembly 505; an electric sliding rail 501 is installed on the upper part of each support beam 101; the two electric sliding rails 501 are respectively connected with an electric sliding block 502; the two electric sliding blocks 502 are respectively and fixedly connected with a suspension frame 503; the lower parts of the two suspension frames 503 are jointly and fixedly connected with the first conveyor assembly 504; the right part of the hull 1 is fixedly connected with the second conveyor assembly 505; the second conveyor assembly 505 is located below the first conveyor assembly 504; and the first conveyor assembly 504 is located above the diversion member 6.

The first conveyor assembly 504 and the second conveyor assembly 505 are electric conveyor belts, and a plurality of water permeable holes are formed in the conveying surfaces thereof, which are used for draining the water on the floating waste during transfer.

Figure 13:
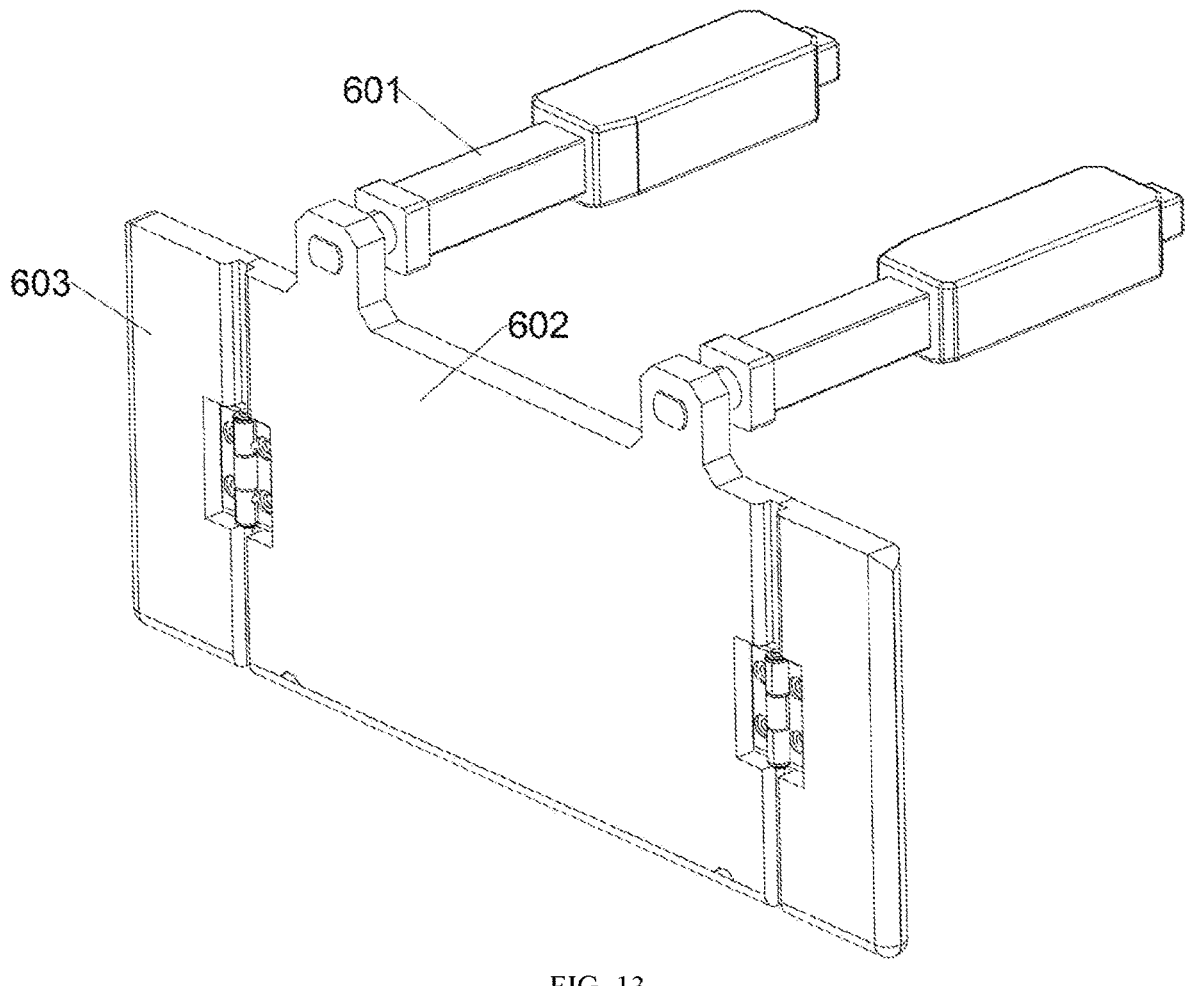
FIG. 13 is a three-dimensional structural schematic diagram of a pushing unit of a water surface floater collecting ship of the present invention.

As shown in FIG. 1 and FIGS. 12-13, the pushing unit comprises third electric actuators 601, a pushing plate 602 and rotating plates 603; two symmetrically arranged third electric actuators 601 are installed on the left part of the hull 1; the telescopic parts of the two third electric actuators 601 are jointly and fixedly connected with the pushing plate 602; the lower part of the pushing plate 602 is slidably connected with the hull 1; and the front part and the rear part of the pushing plate 602 are respectively and movably connected with a rotating plate 603.

The third electric actuators 601 are electric push rods.

When the pushing plate 602 moves to the right, neither of the rotating plates 603 rotates; when the pushing plate 602 moves to the left, both of the rotating plates 603 rotate; and the two rotating plates 603 are folded in a wing shape.

Before the collecting ship is used, the fuel tank 2 is filled with fuel first, then the automatic navigator 3 is controlled to control the hull 1 to move to a water region to be treated, and the water surface floaters are collected by remote control, which effectively reduces the long-time contact between people and the floating waste that results in damage to people's physical and mental health; next, the two second electric actuators 301 are controlled to start up, and the two second electric actuators 301 contract to synchronously drive the upper aerial trap frame 304 and the lower aerial trap frame 305 to move downwards; when the lower aerial trap frame 305 comes into contact with the two connecting rods 201 and the upper aerial trap frame 304 comes into contact with the four limit parts 4001, the two second electric actuators 301 are controlled to shut down to make the top of the upper aerial trap frame 304 flush with the top of the self-flow frame 4; after that, the two first electric actuators 102 are controlled to start up, and the two first electric actuators 102 elongate to synchronously drive the self-flow frame 4 and the counterweight 5 to move downwards; when the top of the self-flow frame 4 is lower than the water surface, the two first electric actuators 102 are controlled to shut down, and the water in the water region flows spontaneously into the self-flow frame 4; meanwhile, with the sinking of the self-flow frame 4, the water in the water region is filled into the self-flow frame 4 through the seepage holes 4002; with the influx of the water, the second sealing plate 203 floats upwards until each cone hole 20301 is blocked by a cone rod 202; at this time, the lower part of the self-flow frame 4 is automatically sealed by the second sealing plate 203; when the water in the water region flows to the self-flow frame 4, water surface floaters are also driven to move towards the self-flow frame 4 and finally fall into the aerial trap enclosed by the upper aerial trap frame 304 and the lower aerial trap frame 305 in the self-flow frame 4; in order to avoid the increase of the water entering the self-flow frame 4 causing the problem that the liquid level in the self-flow frame 4 is flush with the water surface and no water flows to the self-flow frame 4 anymore, the driving assembly 7 is controlled to start up, and the water in the self-flow frame 4 is pumped out by the driving assembly 7 through a water pipe to make the liquid level in the self-flow frame 4 always lower than the water surface; the water pumped out is drained into the drainage compartment 1005 by the output end of the driving assembly 7 through a water pipe, the drainage compartment 1005 is in communication with the water in the water region through the two oblique holes, and the water is directly drained by the drainage compartment 1005 under water surface, so the problem that the water surface floaters float away due to the disturbance of the water surface caused by drainage is avoided.

After a sufficient amount of water surface floating waste is collected in the aerial trap enclosed by the upper aerial trap frame 304 and the lower aerial trap frame 305, the two first electric actuators 102 are controlled to start up, and the two first electric actuators 102 contract to synchronously drive the top of the self-flow frame 4 to be higher than the water surface, so no water flows into the self-flow frame 4 anymore; the two first electric actuators 102 are controlled to shut down; at this time, the two second electric actuators 301 are controlled to start up, the two second electric actuators 301 elongate to synchronously drive the upper aerial trap frame 304 and the lower aerial trap frame 305 to move upwards, and the floating waste is lifted up by the aerial trap enclosed by the upper aerial trap frame 304 and the lower aerial trap frame 305, so the floating waste is separated from the water, and part of the water in the floating waste is initially drained; at this time, the four elastic ropes 306 are stretched; when the lower aerial trap frame 305 is higher than the first conveyor assembly 504, the two second electric actuators 301 are controlled to shut down, and the two electric sliding blocks 502 are controlled to move to the left on each electric sliding rail 501 and synchronously drive the first conveyor assembly 504 to move to the left; when the first conveyor assembly 504 moves to a position below the lower aerial trap frame 305, the two electric sliding blocks 502 are controlled to stop moving; then the four electric telescopic rods 403 are controlled to start up, and the four electric telescopic rods 403 contract to synchronously drive the two transverse rods 402 to move away from each other; meanwhile, the two transverse rods 402 respectively drives two gears 404 to move, and the movement of the gears 404 on the racks 401 makes the two transverse rods 402 rotated by the connecting blocks in the process of moving away from each other, so each aerial trap bottom 30501 is rolled up by one of the two transverse rods 402 respectively in a reel winding mode, which effectively prevents the floating waste from hanging on the aerial trap bottoms 30501; at the same time, when the two aerial trap bottoms 30501 are rolled up, the floating waste on the aerial trap bottoms 30501 falls onto the first conveyor assembly 504; then the first conveyor assembly 504 is controlled to start up, the floating waste is transferred by the first conveyor assembly 504, and the water on the floating waste is drained again; next, the floating waste is transferred by the first conveyor assembly 504 to a position above the second conveyor assembly 505, and the floating waste falls off from the first conveyor assembly 504; when the floating waste falls on the second conveyor assembly 505, the water on the floating waste is drained by the impact force of falling, and the drained water enters the drainage compartment 1005 along the upper surface of the first sealing plate 1002; meanwhile, the second conveyor assembly 505 is controlled to start up, and the floating waste is transferred to the right again by the second conveyor assembly 505 and then discharged into the temporary storage compartment 1001; at this time, as the floating waste is drained on the first conveyor assembly 504 and the second conveyor assembly 505, some water may still remain on the first conveyor assembly 504 and the second conveyor assembly 505; with the diversion member 6 arranged at the discharge end of the second conveyor assembly 505, the water on the second conveyor assembly 505 is diverted into the drainage compartment 1005, so the water in the temporary storage compartment 1001 is reduced, and the weight of the hull 1 is effectively reduced, which is favorable for reducing the fuel consumption and reducing the treatment cost.

When the floating waste is discharged into the temporary storage compartment 1001, in order to avoid the accumulation of the floating waste at the discharge end of the second conveyor assembly 505, reduce the frequency of the collecting ship moving to and from a shore to unload the floating waste, and increase the loading rate of the collecting ship, it is necessary to increase the floating waste containment efficiency of the temporary storage tank 1001; each time after the floating waste is discharged by the discharging unit, the four electric telescopic rods 403 is controlled to elongate, the two transverse rods 402 are synchronously controlled to be restored, the first conveyor assembly 504 and the second conveyor assembly 505 are controlled to shut down, and the two second electric actuators 301 are controlled to start up; the two second electric actuators 301 contract to synchronously drive the upper aerial trap frame 304 and the lower aerial trap frame 305 to enter the self-flow frame 4 when the four elastic ropes 306 are restored; then the first conveyor assembly 504 is controlled to be restored, the two third electric actuator 601 are controlled to start up, and the two third electric actuators 601 elongate to synchronously control the pushing plate 602 and the two rotating plates 603 to move to the right; as the two rotating plates 603 do not rotate when moving to the right, the floating waste unloaded from the second conveyor assembly 505 is pushed to the right by the pushing plate 602 and the two rotating plates 603 together, and the floating waste is not accumulated at the discharge end of the second conveyor assembly 505; as the floating waste is pushed to the right, the floating waste is effectively compressed by the mutual extrusion of the floating waste, which reduces the space occupied by the floating waste, increases the containment efficiency of the collecting ship, and reduces the frequency of the collecting ship moving to and from a shore to unload the floating waste; in addition, the two third electric actuator 601 are controlled to contract to make the pushing plate 602 and the two rotating plates 603 move to the left; when the rotating plates 603 are hooked by the floating waste, the rotating plates 603 rotate, which effectively reduces the hooking of the floating waste, and reduces the adhesion of the floating waste to the right side of the pushing plate 602 and the two rotating plates 603.

Finally, it should be noted that the above description is only a preferred embodiment of the present invention, and is not intended to limit the present invention. Although the present invention is described in detail with reference to the above embodiment, those skilled in the art may still modify the technical solution recorded in the above embodiment, or equivalently replace some of the technical features. Any modification, equivalent replacement, improvement, etc. made within the spirit and the principle of the present invention shall be included within the protection scope of the present invention.

The invention claimed is:

1. A water surface floater collecting ship, comprising a hull (1), a fuel tank (2), an automatic navigator (3) and a driving assembly (7); wherein the fuel tank (2) is installed on the right part of the hull (1); the automatic navigator (3) is installed on the right part of the hull (1); the automatic navigator (3) is located in front of the fuel tank (2); the driving assembly (7) is installed on the left part of the hull (1); the left part of the hull (1) is fixedly connected with a first sealing plate (1002) and a water baffle plate (1003) in sequence; the hull (1) is divided into a power compartment (1004), a drainage compartment (1005) and a temporary storage compartment (1001) in sequence by the first sealing plate (1002) and the water baffle plate (1003); two through holes oblique to the right are formed in the drainage compartment (1005), and the drainage compartment (1005) is in communication with a water body through the two through holes; the driving assembly (7) is located in the power compartment (1004); an output end of the driving assembly (7) is in communication with the drainage compartment (1005) through a water pipe; the present invention also comprises a collecting system, a dreg filter system and a pushing unit; the left part of the hull (1) is connected with the collecting system used for collecting waste; the collecting system is connected with the dreg filter system used for separating floating waste from water and draining the floating waste; the dreg filter system is connected with the hull (1); the left part of the hull (1) is connected with the pushing unit used for compressing the waste onboard; and the collecting system is connected with the dreg filter system;

the collecting system is composed of a self-flow frame (4), a counterweight (5), a self-flow unit and a self-sealing unit; the left part of the hull (1) is connected with the self-flow unit used for collecting floaters; the left part of the self-flow unit is connected with the self-flow frame (4); a limit part (4001) is arranged on each of the four corners of the inner surface of the self-flow frame (4); two rows of symmetrical seepage holes (4002) are formed in the bottom of the self-flow frame (4); the lower part of the outer surface of the self-flow frame (4) is fixedly connected with the counterweight (5); the inner part of the self-flow frame (4) is connected with the self-sealing unit; an input end of the driving assembly (7) is connected with the self-flow frame (4) through a water pipe; the self-flow unit comprises support beams (101), first electric actuators (102), transverse plates (103) and support rods (104); the left part of the hull (1) is fixedly connected with two symmetrically arranged support beams (101); the two support beams (101) are connected with the dreg filter system; a first electric actuator (102) is installed on the left part of each support beam (101); the telescopic parts of the two first electric actuators (102) are respectively and fixedly connected with a transverse plate (103); the lower parts of the two transverse plates (103) are respectively and fixedly connected with a support rod (104); the two support rods (104) are jointly connected with the dreg filter system; and the lower parts of the two support rods (104) are jointly and fixedly connected with the self-flow frame (4).

2. The water surface floater collecting ship according to claim 1, wherein the self-sealing unit comprises connecting rods (201), taper rods (202) and a second sealing plate (203); the front part and the rear part of the inner surface of the self-flow frame (4) are respectively and fixedly connected with a connecting rod (201); the connecting rods (201) are connected with the dreg filter system; the lower surfaces of the two connecting rod (201) are fixedly connected with a plurality of taper rods (202); each taper rod (202) is in correspondence to a seepage hole (4002); the second sealing plate (203) is movably arranged in the self-flow frame (4); two rows of taper holes (20301) are symmetrically formed in the second sealing plate (203); each row of taper holes (20301) are in correspondence to one row of seepage holes (4002); and each taper rod (202) passes through one taper hole (20301).

3. The water surface floater collecting ship according to claim 2, wherein the dreg filter system is composed of a diversion member (6), a filter unit, a discharging unit and a transfer unit; the two support rods (104) are jointly connected with the filter unit used for separating floating waste from water; the lower part of the filter unit is connected with the connecting rods (201); the filter unit is connected with the discharging unit used for discharging floating waste; the left part of the hull (1) is connected with the transfer unit used for draining the floating waste and transferring the floating waste to the temporary storage compartment (1001); the water baffle plate (1003) is fixedly connected with the diversion member (6); the diversion member (6) is located below the transfer unit; the two support beams (101) are connected with the transfer unit; the filter unit comprises second electric actuators (301), T-plates (302), pull ropes (303), an upper aerial trap frame (304), a lower aerial trap frame (305) and elastic ropes (306); a second electric actuator (301) is installed in each support rod (104); the telescopic parts of the two second electric actuators (301) are respectively and fixedly connected with a T-plate (302); the left parts and the right parts of the two T-plates (302) are respectively connected with a pull rope (303); the lower parts of the four pull ropes (303) are jointly connected with the upper aerial trap frame (304); the upper aerial trap frame (304) is connected with the lower aerial trap frame (305) through a catch net; the lower aerial trap frame (305) is connected with the discharging unit; the lower aerial trap frame (305) is connected with two symmetrical aerial trap bottoms (30501); a straight slot (30502) is respectively formed in the left part and the right part of the lower aerial trap frame (305); the front part and the rear part of the lower aerial trap frame (305) are respectively connected with two elastic ropes (306); and the lower parts of two adjacent elastic ropes (306) are jointly connected with a connecting rod (201).

4. The water surface floater collecting ship according to claim 3, wherein the discharging unit comprises racks (401), transverse rods (402), electric telescopic rods (403) and gears (404); a rack (401) is respectively installed on the left part and the right part of the lower aerial trap frame (305); the lower aerial trap frame (305) is slidably connected with two symmetrically arranged transverse rods (402) through connecting blocks; the back sides of the two transverse rods (402) are respectively connected with an aerial trap bottom (30501); two electric telescopic rods (403) are installed in each straight slot (30502); the telescopic parts of the two electric telescopic rods (403) in the front are jointly and fixedly connected with one transverse rod (402) through connecting blocks; the telescopic parts of the two electric telescopic rods (403) in the rear are jointly and fixedly connected with the other transverse rod (402) through connecting blocks; the left part and the right part of each transverse rod (402) are respectively and fixedly connected with a gear (404); and the upper parts of two adjacent gears (404) are engaged with a rack (401).

5. The water surface floater collecting ship according to claim 4, wherein the transfer unit comprises electric sliding rails (501), electric sliding blocks (502), suspension frames (503), a first conveyor assembly (504) and a second conveyor assembly (505); an electric sliding rail (501) is installed on the upper part of each support beam (101); the two electric sliding rails (501) are respectively connected with an electric sliding block (502); the two electric sliding blocks (502) are respectively and fixedly connected with a suspension frame (503); the lower parts of the two suspension frames (503) are jointly and fixedly connected with the first conveyor assembly (504); the right part of the hull (1) is fixedly connected with the second conveyor assembly (505); the second conveyor assembly (505) is located below the first conveyor assembly (504); and the first conveyor assembly (504) is located above the diversion member (6).

6. The water surface floater collecting ship according to claim 5, wherein the pushing unit comprises third electric actuators (601), a pushing plate (602) and rotating plates (603); two symmetrically arranged third electric actuators (601) are installed on the left part of the hull (1); the telescopic parts of the two third electric actuators (601) are jointly and fixedly connected with the pushing plate (602); the lower part of the pushing plate (602) is slidably connected with the hull (1); and the front part and the rear part of the pushing plate (602) are respectively and movably connected with a rotating plate (603).

7. The water surface floater collecting ship according to claim 6, wherein when the pushing plate (602) moves to the right, neither of the rotating plates (603) rotates; when the pushing plate (602) moves to the left, both of the rotating plates (603) rotate; and the two rotating plates (603) are folded in a wing shape.

8. The water surface floater collecting ship according to claim 5, wherein the first conveyor assembly (504) and the second conveyor assembly (505) are electric conveyor belts, and a plurality of water permeable holes are formed in the conveying surfaces thereof.

9. The water surface floater collecting ship according to claim 2, wherein the second sealing plate (203) is made of a foam floating material.

\* \* \* \* \*